United States Patent Office

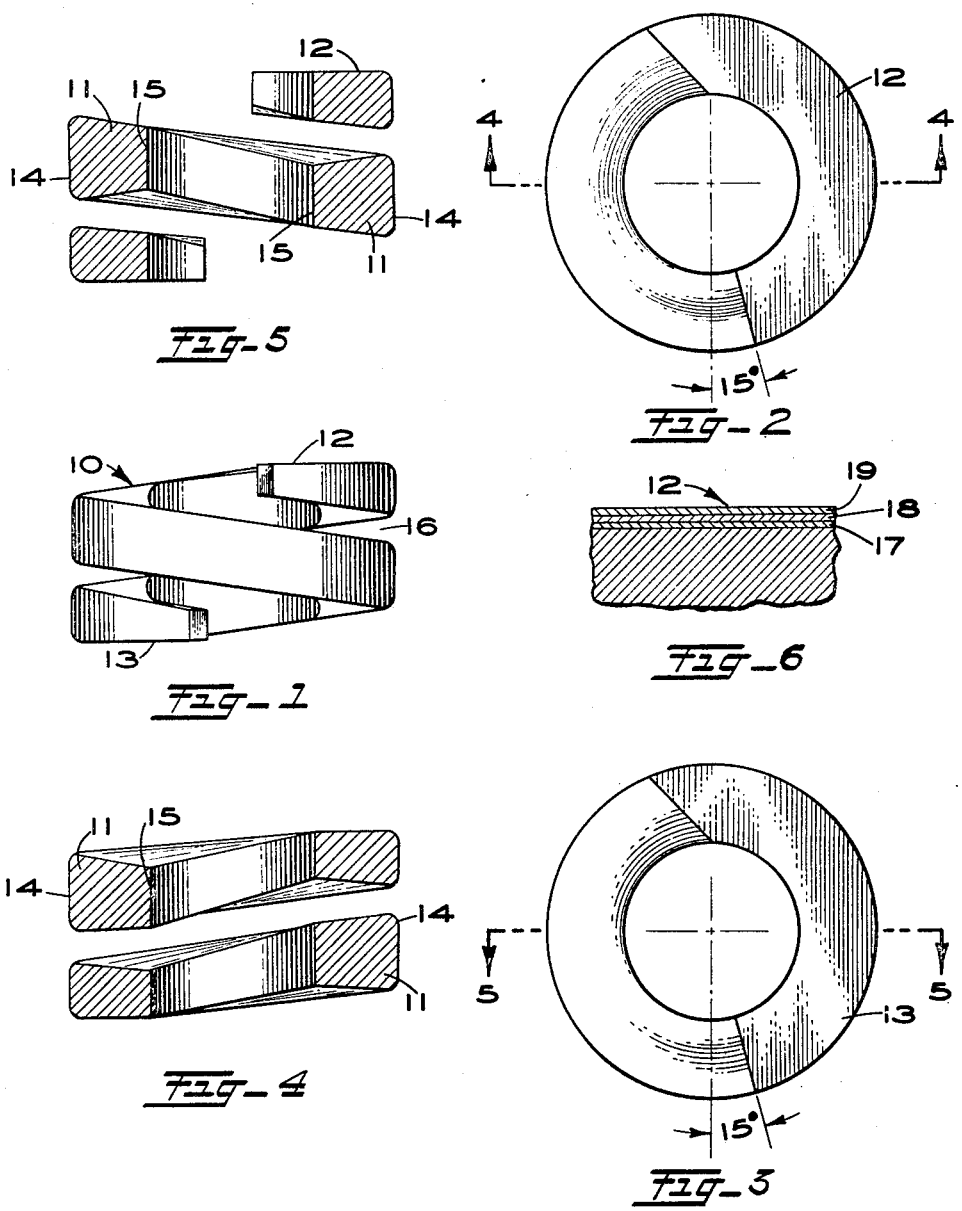

3,494,400
Patented Feb. 10, 1970

---

3,494,400
HELICAL SPRING LOCKWASHER
John J. McCoy, 4795 N. Cramer St., Whitefish Bay,
Wis. 53217, and "J." Hebden Willox, 917 New-
castle Ave., Westchester, Ill. 60153
Filed Oct. 24, 1967, Ser. No. 677,701
Int. Cl. F16b *39/22;* B21d *53/20, 53/24*
U.S. Cl. 151—38                                 4 Claims

ABSTRACT OF THE DISCLOSURE

An open helical spring lockwasher capable of compensating for relatively large longitudinal movement between fastener elements, formed from a metal keystone shaped wire and having more than one full turn, the ends flattened by grinding along parallel transverse planes and having mechanically deposited thereon one or more layers of a soft metal; and method of production.

---

This invention relates generally to open helical spring metal lockwashers, particularly for use with galvanized hardware holding high tension electric structural members in engagement where a substantial longitudinal movement of the lockwasher is required to compensate for change in dimensions of the structural members, such as those occurring from the weathering of coniferous woods, for example.

Helical spring lockwashers heretofore known are formed as helices with sharp, square cut ends or with other small area contact surfaces, which under longitudinally applied pressure dig into the mating surface to lock the elements in place. The pressure so deflects the washer that it bears against the associated bolt at two spaced points, tending to bend the bolt. The stress thus applied may exceed the strength of the bolt at the thread root and cause rupture of the bolt. In addition, the sharp ends or small contact areas may act as cutting tools, removing and nullifying the value of any protective coating, as well as cutting into the facing members and destroying their reusability.

It is one object of the present invention to provide a helical spring lockwasher of more than one turn which has large, flattened end bearing surfaces, and is free of all sharp or square cut ends.

Another object is the provision of a helical spring lockwasher formed from a wire of quadrilateral cross section having at least two parallel sides; e.g., trapezoidal or keystone, wound into a coil in which the parallel sides are disposed along the inner and outer margin of the helical turns, or, if the cross section is trapezoidal in shape, the longer of its parallel sides is disposed along the outer periphery of the helix.

A further object is to provide a helical spring washer so formed that the end surfaces of an arcuate end portion are flat bearing surfaces which lie in axially spaced parallel planes extending transversely across the axis of the helical coil.

Another object is the provision of a helical spring lockwasher having flat end-engaging surfaces overlaid with one or more layers of a mechanically deposited soft metal compatible with the galvanized hardware commonly in use on high tension electric structures and adapted to metallically lubricate the cooperating mating surfaces when they are pressured into abutment as an associated fastener element is tightened.

Another object is the provision of a helical spring lockwasher having a turn length and a turn spacing effective in maintaining pressure both on associated metal fastener components employed to join coniferous wood members and the members themselves, thereby making available a spark-suppressing lockwasher particularly useful with high voltage wood structures for precluding induced radio-interfering sparking which otherwise will occur between loose, closely spaced metal fastener elements.

With these and other objects in view which will appear as the description proceeds, reference is made to the accompanying drawing of an embodiment of the invention, in which:

FIG. 1 is an elevational view of the invention;
FIG. 2 is a plan view as seen from above;
FIG. 3 is a plan view as seen from below;
FIG. 4 is a section along the line 4—4 of FIG. 2;
FIG. 5 is a section along the line 5—5 of FIG. 3; and
FIG. 6 is a fragmentary view of a portion of an end surface of the washer.

As shown in FIG. 1, the washer generally indicated by the numeral 10 is an open turn helical coil of more than one and less than two turns, and, as indicated in FIGS. 4 and 5, the coil is wound from a trapezoidal or keystone metal wire 11, with the longer of the parallel sides 14 of the trapezoid disposed at the outer periphery of the coil, and the shorter parallel side 15 along the inner periphery of the coil. A suitable material for the washer is SAE 1060 wire, which is formed to the desired trapezoidal shape on wire-drawing and wire-forming machines having rolls of 4½ degree taper.

The ends of the helix are severed along planes which diverge from one another at an angle of at least 30 degrees and which intersect at the axis of the coil, as may be seen by an inspection of FIG. 2 in conjunction with FIG. 3. As illustrated, the preferred embodiment is constituted of a helix having a widely spaced turn spacing, as indicated at 16, the helix extending through an angle of 690 degrees. After end-trimming as described above, the material is hardened to maximum Rockwell hardness, and then slowly drawn to Rockwell C-40 to C-50.

After heat treatment each end portion of the helix is ground along parallel, transversely extending planes, so that at least one-half of the keystone section is removed, as measured at the respective ends. The helical coil so ground presents identical wide bearing end surfaces along circumferentially spaced arcuate end portions, as indicated at 12 and 13 of FIGS. 2 and 3, each such end bearing surface extending through an angle of at least 120 degrees from each end of the coil. The shape of the wide bearing end surface results from the specified disposition of the trapezoidal cross section as the coil is wound.

To reduce the friction at each end of the lockwasher when it is positioned on a bolt between a nut and other engaged metal surfaces, the end surfaces 12 and 13 are covered with a relatively soft metallic coating. As indicated by the fragmentary section of FIG. 6, this coating is formed as a three-stage plate, the preferred composition of which is a first base layer of tin 17, a second intermediate layer of zinc 18 and a third outer layer of tin 19. The respective adherent layers are mechanically deposited to a sufficient thickness to pass a 2000 hour life test in a normal salt spray procedure. The mechanical deposition is preferred because such a procedure may be carried through without adversely affecting the physical properties of the base metal. The soft metal coating smears under sliding frictional stress, lubricating the abutting surfaces. The coating metals are compatible with the zinc galvanizing commonly used as a rust preventive on pole line hardware, and the smearing action causes the soft metal to fill minute pinholes and other holidays occurring in galvanizing, which, if unsealed, expose rust-prone metal to corrosive destruction.

The invention herein effectively precludes the degradation of corrosion resistant protection commonly resulting from the use of lockwashers having a small contact end bearing which cannot lock the associated components without shearing away a protective coating. Applicants' coil spring washer "locks" simply by virtue of continuous pressure against the mating surfaces, applied through such longitudinal movement as may be necessary for compensation in structures having bolted connections of wood members.

Further, the 30-degree circumferential spacing between the bearing ends of the helix, in cooperation with the half stock grind removal and the trapezoidal shape and disposition, eliminates two serious problems heretofore presented by helical washers of two turns with unchamfered ends. One is undesired deflection on the lockwasher from the coaxial position, which may stress an associated bolt by bending to complete rupture. The other is the inherent tendency of simple double turn coils to shear near the center of the coil spring when fully compressed. In applicants' construction, the weakening and the relative positions (30-degree divergence) of the tapered end surfaces permit the ends to so deform with gradually increasing and limited pressure as to reduce the stress at the center of the coil to a safe value while still maintaining the essential capacity for resilient longitudinal movement, even when the helix is compressed to turn-to-turn abutment.

The helical lockwasher herein is particularly adapted for use as a spark-suppressing lockwasher with hardware joining pine or fir wood members of high voltage transmission line structures, such as a fir crossarm to a pine pole. The energized conductors supported by the cross arm may be a source of radio interference from low voltage induced sparking between closely spaced loose hardware elements. When exposed to contaminated atmospheres, burning of the wood members will result from leakage current if such current has point or low area distribution. Loose or misaligned hardware elements are the principal cause of radio interference and structure burning of wood members carrying high tension conductors. The use of applicants' spring lockwasher has been found to be the most effective and inexpensive means known for precluding loosening or misalignment of metal fastener members and the adverse effects for which these defective conditions are responsible.

While we have illustrated and described herein a single embodiment of the present invention, it will be apparent that changes and modifications may readily be effected by those skilled in the art. It is therefore intended that the drawing and description shall be regarded as illustrative of the preferred construction, rather than limiting.

What is claimed as new and desired to be secured by Letters Patent of the United States is:

1. A spark-suppressing lockwasher for precluding induced sparking between loose and closely spaced hardware elements of a high tension electric structure, said spark-suppressing washer comprising a helical spring metal coil having more than one full turn of a wire of trapezoidal cross section, the parallel sides of the trapezoidal wire forming the inner and outer periphery of the helical turns, an end bearing surface extending over an arcuate portion of each end of the helical coil and lying in transversely extending axially spaced parallel planes, and a mechanically applied relatively soft metal plating covering the end bearing surfaces, said plating consisting essentially of a first layer of tin, a second superimposed intermediate layer of zinc and a third outer layer of tin.

2. A metal lockwasher comprising a helical coil having more than one full turn of a wire of trapezoidal cross section, the parallel sides of the trapezoidal wire extending respectively along the inner and outer periphery of the helical turns, the longer of the parallel sides being disposed along the outer periphery, and the helical coil extending not more than 340 degrees and not less than 320 degrees beyond one full turn, the respective ends of the coil lying in planes coaxial with the coil axis and diverging from one another at an angle of 30 degrees.

3. A metal lockwasher comprising a helical coil having more than one full turn of a wire of trapezoidal cross section, the parallel sides of the trapezoidal wire extending respectively along the inner and outer periphery of the helical turns, the longer of the parallel sides being disposed along the outer periphery and the end bearing surfaces of an arcuate end portion at each end of the helical coil lying in transversely extending parallel planes, the helical coil having at least one and three quarter turns and less than two turns and the end bearing surfaces extending around the respective arcuate end portions through an angle of at least 120 degrees from each end of the coil, and a deposit over the arcuate planar end surfaces of a layer of a metal softener and more malleable than the metal forming the coil, said deposit consisting essentially of a first layer of tin, a second superimposed layer of zinc and a third outer layer of tin.

4. The method of producing a lockwasher which comprises winding a steel wire of keystone shaped cross section into an open helix of more than one full turn with the longer of the parallel sides of the keystone shape as the outer periphery of the helical turns, grinding the respective arcuate end portions of the helix along axially spaced parallel planes extending transversely and normal to the axis of the helix to remove at least one-half of the keystone section as measured parallel to the axis of the helix, plating a soft malleable metal over the ground surface at each end of the helix by the mechanical application sequentially of a first layer of tin to the base metal, a second intermediate layer of zinc and a third outer layer of tin.

References Cited

UNITED STATES PATENTS

| 303,302 | 8/1884 | Ludlum | 207—61 |
|---|---|---|---|
| 1,615,707 | 1/1927 | Jones et al. | |
| 2,490,978 | 12/1949 | Osterheld. | |
| 2,943,870 | 7/1960 | Davis. | |
| 3,399,269 | 8/1968 | Willox | 151—38 |

FOREIGN PATENTS

| 732,313 | 6/1955 | Great Britain. |
|---|---|---|
| 811,573 | 4/1959 | Great Britain. |

EDWARD C. ALLEN, Primary Examiner

U.S. Cl. X.R.

10—86; 29—191; 117—71